(12) United States Patent
Droege et al.

(10) Patent No.: US 11,790,358 B1
(45) Date of Patent: Oct. 17, 2023

(54) SYSTEMS AND METHODS FOR GENERATING A ONE-TIME USE TOKEN FOR ITEM PURCHASE

(71) Applicant: Relay Payments, Inc., Atlanta, GA (US)

(72) Inventors: James Ryan Droege, Atlanta, GA (US); Spencer Barkoff, Atlanta, GA (US); Sergii Koval, Atlanta, GA (US)

(73) Assignee: RELAY PAYMENTS, INC., Atlanta, GA (US)

( * ) Notice: Subject to any disclaimer, the term of this patent is extended or adjusted under 35 U.S.C. 154(b) by 0 days.

(21) Appl. No.: 18/333,481

(22) Filed: Jun. 12, 2023

(51) Int. Cl.
*G06Q 20/38* (2012.01)
*G06Q 50/06* (2012.01)
*B67D 7/34* (2010.01)
*B67D 7/14* (2010.01)
*B67D 7/04* (2010.01)

(52) U.S. Cl.
CPC ............ *G06Q 20/385* (2013.01); *B67D 7/04* (2013.01); *B67D 7/145* (2013.01); *B67D 7/348* (2013.01); *G06Q 50/06* (2013.01)

(58) Field of Classification Search
CPC ........ G06Q 20/385; B67D 7/04; B67D 7/145; B67D 7/348
See application file for complete search history.

(56) References Cited

U.S. PATENT DOCUMENTS

| 11,519,770 | B1 * | 12/2022 | Morris | B67D 7/145 |
| 2013/0304544 | A1 * | 11/2013 | Gillis | G06Q 30/0206 705/7.34 |
| 2015/0332264 | A1 * | 11/2015 | Bondesen | G06Q 20/3821 705/44 |
| 2017/0357996 | A1 * | 12/2017 | Jones | G06Q 20/20 |
| 2019/0295077 | A1 * | 9/2019 | Mardikar | G06Q 20/401 |
| 2022/0114584 | A1 * | 4/2022 | Conley | G06Q 20/3674 |

* cited by examiner

*Primary Examiner* — Scott C Anderson
(74) *Attorney, Agent, or Firm* — EVERSHEDS SUTHERLAND (US) LLP

(57) ABSTRACT

Systems and methods are disclosed for payment system that uses one-time use tokens for securely facilitating and controlling user purchases using company funds. A user (e.g., driver) may generate a request to make a purchase using a user application. The request may be sent to a server running a payment system that may generate a one-time use token for the purchase of an item (e.g., fuel). The one-time use token may have an expiration time and may only be redeemable at certain locations (e.g., fueling stations) that have been preapproved. The system may send the user application running on the user device the token for purchasing fuel and approved locations. The user may input the token to a controller at an approved location which may request that the server authenticate the token and approve the purchase. Once authenticated and approved, the controller may permit the purchase of the desired item.

20 Claims, 8 Drawing Sheets

SYSTEMS AND METHODS FOR GENERATING A ONE-TIME USE TOKEN FOR ITEM PURCHASE

BACKGROUND

Often in industries like the trucking industry, companies will give their employees or contractors a cost allotment or per diem for purchases related to their job. For example, in the trucking industry, drivers may be given a certain cost allotment for fuel for their truck as well as for trucking supplies (e.g., straps, flaps, locks, etc.). Similarly companies may give their drivers a certain per diem amount for food, snacks and/or coffee. To make these purchases, a driver may be given a credit or debit card (e.g., with a magnetic strip), which may be associated with the company. The card may have certain pay limits (e.g., a set amount per day). While the companies can set rudimentary constraints on the payments (e.g., only 20 dollars per day) a company is limited in its ability to control what is purchased with the card, when the purchases are made, and where. Further, such a payment system is susceptible to fraud as drivers can use their card to make purchases for other drivers. Also, a lost card could be used by a non-authorized individual to make purchases. Similar payment risks and concerns exist in other industries such as delivery and repair services. Accordingly, there is a need for a company payment system permitting companies or other entities more control over the purchases made using company funds and reducing the risk of unauthorized purchases.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
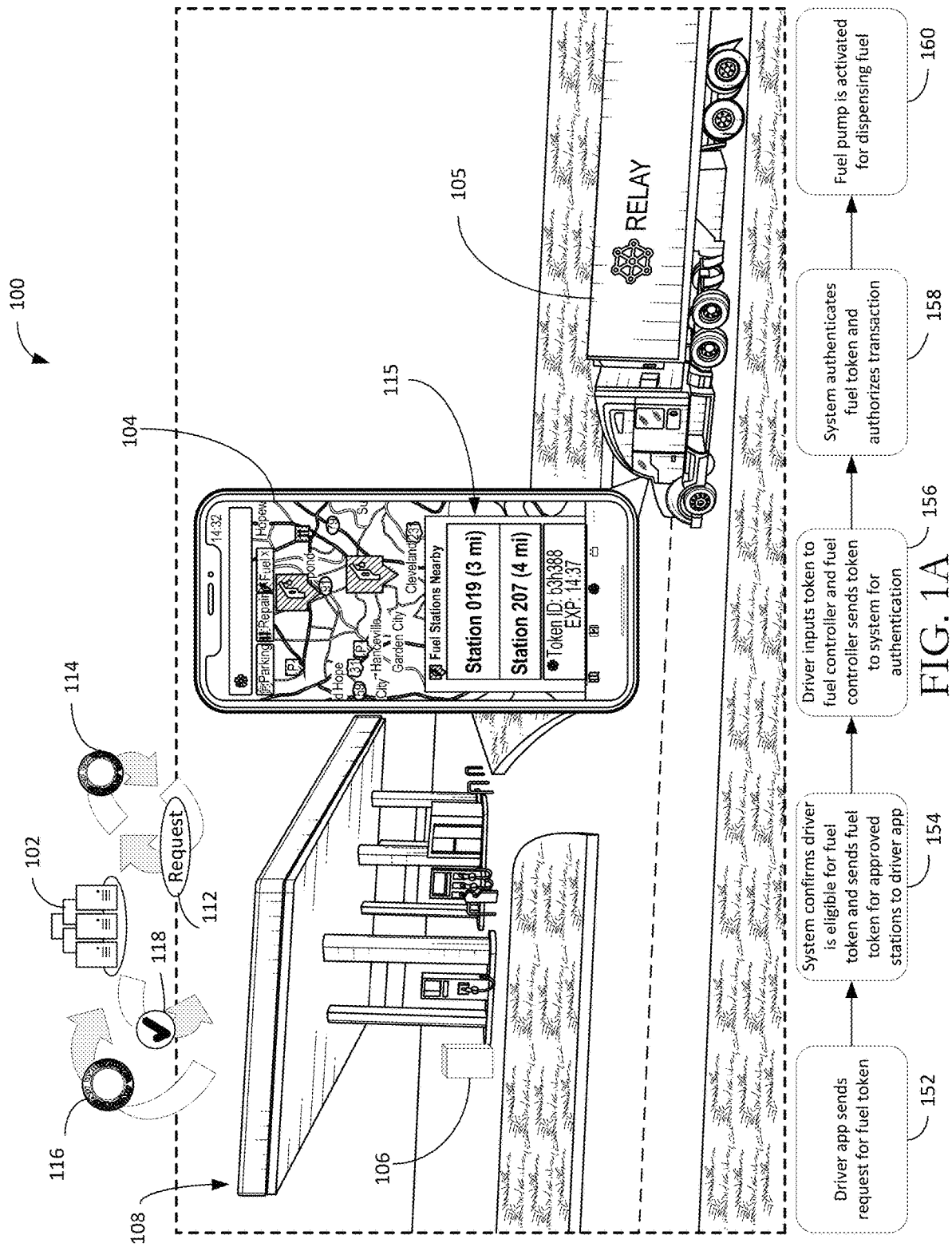
FIG. 1A is a schematic illustration of an example use case of a payment system for generating a token for use at a fuel station, in accordance with one or more exemplary embodiments of the disclosure.

Payment systems and methods are provided herein for facilitating purchase of fuel, services, and/or items in conformity with parameters set by a company or other overseeing entity. In one example, the payment system may be a fuel payment system and may generate a one-time token for purchasing fuel for drivers such as truck drivers. The one-time token may be received by the driver and input into or otherwise communicated to a pump controller. The pump controller may request that the system authenticate a purchase request using the token and may permit the purchase upon authentication and/or approval from the payment system.

The payment system may include a cloud based system (e.g., run on a server) and a user (e.g., driver) application run on a user device (e.g., smart phone) that may communicate with the server. A user may request a token for an upcoming purchase, such as a purchase of fuel. The user device may send the request to the server, which may also include information such as a driver identifier, a company identifier, a vehicle identifier, a device identifier, location data, time data, and/or information about the requested purchase (e.g., what item is being purchased). The payment system may compare the request with information associated with the driver identifier and/or company identifier to determine whether to generate a one-time use token to facilitate the requested purchase.

The system may determine a fuel allotment amount corresponding to the driver identifier or a company parameter limiting fuel purchases (e.g., one purchase per day, one purchase per distance traveled, a fuel allotment for a given week, or any other limiting parameter). The system may compare the request to the restrictions and/or parameters associated with the user and/or company identifiers to determine whether to generate a token. If a token is generated, it will be communicated back to the user device. The token may be associated with approved fueling stations and an expiration time.

The user may then input the token or otherwise communicate the token and a driver identifier at an approved station before the time expiration. A pump controller may communicate the token and the driver identifier to the server to authenticate and/or approve the purchase. The server may compare the token to the user identifier and any constraints or rules associated with the driver identifier and/or company identifier. If the constraints and/or rules are satisfied the, server may send a message to the pump controller authorizing and/or approving the transaction.

It is understood that a similar process may be used to authorize and/or approve purchases other than fuel. For example, purchases at a store (e.g., fuel station store), market, restaurant, repair garage, port of entry, or the like may be made. For such purchases involving different categories or types of products, items, fees, costs and/or services, the system may track and consider certain rules and/or constraints specific to these categories. For example, the number of coffees or tires purchased in a given time period may be limited by amount or quantity.

Referring now to FIG. 1A, an exemplary payment system for fuel purchases is illustrated in accordance with one or more exemplary embodiments of the disclosure. Payment system 100 may include a cloud based system (e.g., software, platform, application) run on server 102, which may be in communication with user devices, such as user device 104 and controllers at various stations such as pump controller 106 at fuel station 108.

User device 104 may be any computing device with a processor and a display. For example, user device 104 be one or more smart phones, smart devices (e.g., smart watch), laptop or desktop computers, and/or any other suitable electronic or computing device. Server 102 may be any computing device with a processor. For example, server 102 may be one or more severs, computers, desktop computers, controllers, laptop computers, datastores, and/or any other electronic or computing device. Pump controller 106 may be any computing device. For example pump controller may be one or more severs, computers, desktop computers, controllers, laptop computers, datastores, and/or any other electronic or computing device.

It is understood that pump controller may be located at pump station 108, which may be any type of fueling station for dispensing fuel to vehicles (e.g., trucks). Pump station 108 may include one or several pump controllers 106. Further, user device 104 and/or server 102 may be positioned in different locations. For example, the user device may be traveling with a driver in truck and server 102 may be positioned several (e.g., hundreds or thousands) miles away.

User device 104 and server 102 may communicate via any suitable wireless system (e.g., cellular network, satellite network, Bluetooth, Bluetooth Low Energy (BLE), near field communication protocol, Wi-Fi, etc.). Similarly, server 102 and pump controller 106 may communicate via any suitable wireless system (e.g., cellular network, satellite network, Wi-Fi, etc.). Optionally, user device 104 may communicate with pump controller 106 via any suitable wireless system (e.g., cellular network, satellite network, Bluetooth, Bluetooth Low Energy (BLE), near field communication protocol, Wi-Fi, etc.).

The payment system illustrated in FIG. 1A may be initiated at block 152 which starts with the user application sending request 112 to server 102 to purchase fuel. Server 102 may be one or more components and/or modules discussed in greater detail with respect to FIG. 1B. This may be a request for a token such as a fuel token. More specifically, a user using user device 104 which may run user application 115 on user device 104 may be a driver of truck 105 and may be in need of fuel for truck 105. The user may use user application 115 to contact server 102 with request 112 to purchase fuel nearby.

At block 154, if the request is approved, server 102 may send a one-time use token (e.g., token 114) to user application 115 running on user device 115 (e.g., via a cellular network). For example, the system may confirm a driver corresponding to a driver identifier is eligible for fuel (e.g., eligible to receive a fuel token). The system running on server 102 may consider certain rules and constraints associated with the driver identifier and/or a company identifier associated with the driver identifier. For example, the driver may be limited to a certain amount of fuel per day or week or a certain amount of fuel per miles driven, or any other restraint relating to fuel purchasing or consumption.

If the request satisfies the rules and constraints associated with the driver identifier and/or company identifier, server 102 will then send one-time use token to purchase fuel (e.g., fuel token) to user device 104 running user application 115. Server 102 may also include an expiration time associated with the token specifying a time for which the token must be used before expiring. Also, sever 102 may send user device 115 one or more approved fueling stations within a certain distance of user device 104 (e.g., 5 miles, 10 miles, 15 miles, etc.).

User application 115 may present the fueling stations on a display of user device 104 and/or may present the token and expiration time. In one example, the token may be an alphanumeric code, but it understood that the token may be any other code or value. Alternatively, or additionally, the token may be a computer readable image or code (e.g., QR code, bar code, etc.), a token generated using blockchain technology, a digitized message, or any other suitable code or token. The fueling stations may be preapproved by the company (e.g., in-network stations). User device 104 may also present a map showing the stations. In one embodiment, a user may select a station to initiate navigation to the station on user device 115.

At block 156, a driver may input or otherwise communicate the token to fuel controller 106 and the fuel controller may communicate the token and a request for authentication and/or approval to server 102. For example, a driver may manually input the token alphanumeric value into a keypad or touchscreen into pump controller 106 or a fuel pump in communication with pump controller 106. Alternatively, a driver may scan a QR code, bar code, or otherwise wirelessly communicate a code or token to pump controller 106. The driver may also input other information such as a driver identifier, company identifier, vehicle identifier, and the like. Pump controller 106 may communicate token 116 and/or any other information provided by the driver and/or a station identifier to server 102.

Server 102 running the payment system may authenticate and/or approve the token and authorize the transaction. For example, server 102 may confirm token 116 is the same as token 114, that the token is associated with the driver and/or company identifier, that the token has not expired, and that the station identifier is approved for that token. Then upon authenticating the token and confirming that certain rules and/or constraints are satisfied, server 102 may send pump controller 106 a message approving and/or authorizing (e.g., approval message 118) the transaction, permitting the purchase of fuel. Server 102 may also send pump controller 106 certain rules and/or constraints, such as a fuel limit (e.g., 100 gallons).

At block 160, a fuel pump in communication with pump controller 106 and/or incorporated with pump controller 106 may be activated by pump controller 106. Pump controller 106 may cause the fuel pump to cease after a certain amount of gallons have been dispensed (e.g., 100 gallons) based the constraints and/or rules provided by server 102. It is understood that one or more of the steps in FIG. 1A may be optional and/or may be performed in a different order.

Figure 1B:
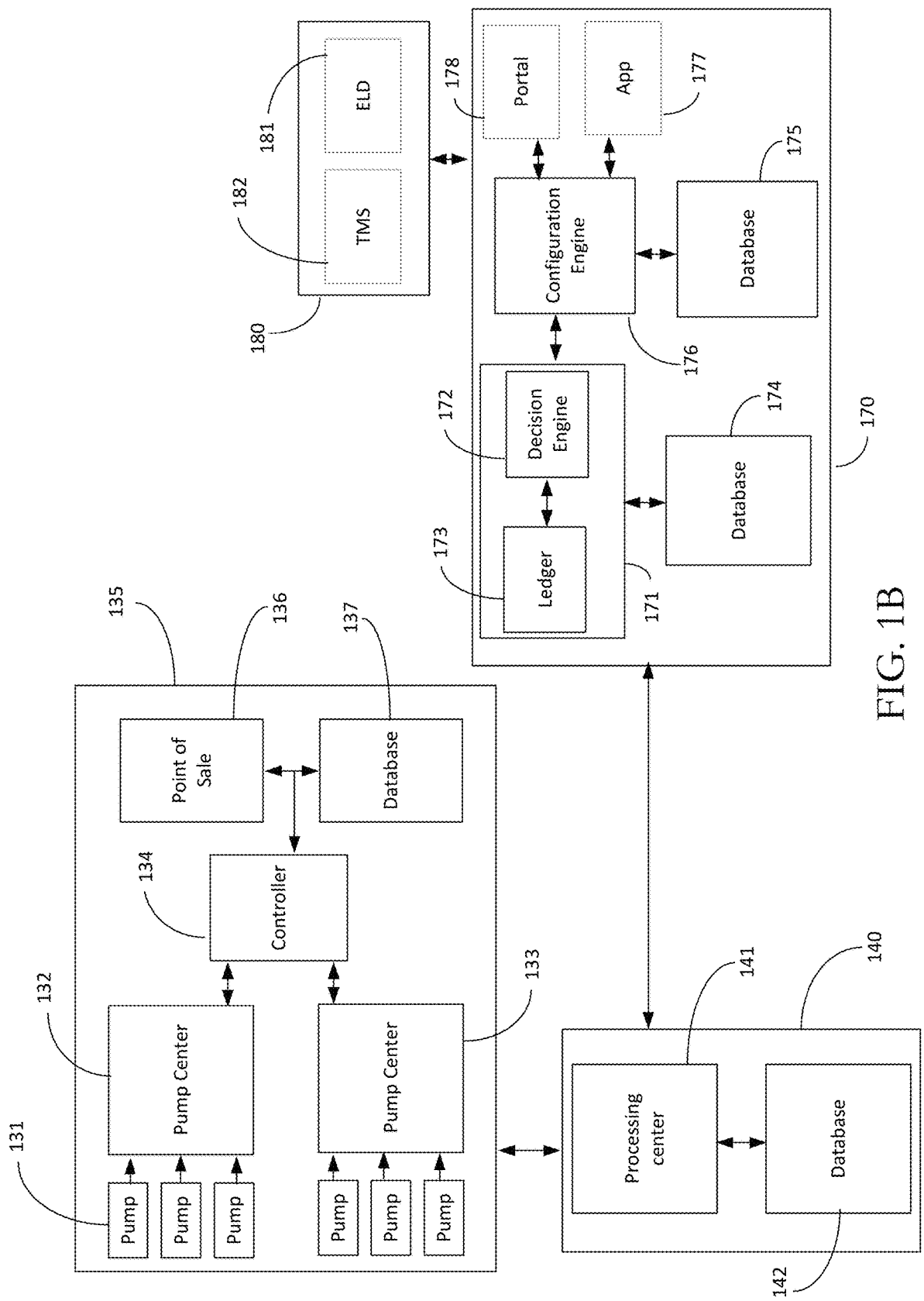
FIG. 1B is a schematic illustration of exemplary modules included in the payment system, in accordance with one or more exemplary embodiments of the disclosure.

Referring now to FIG. 1B, a schematic illustration of exemplary modules included in the payment platform of the payment system, in accordance with one or more exemplary embodiments of the disclosure is illustrated. One or more of the modules and/or components illustrated in FIG. 1B may be run on and/or executed by server 102 and/or controller 106 of FIG. 1A. It is understood that one or more modules and/or components of FIG. 1B may be optional and/or that other modules and/or components may be included.

As shown in FIG. 1B, pump site 135 may include several pumps (e.g., pump 131). Each pump may be connected to pump center 132 which may be a fuel pump (e.g., diesel pump). Pump center 132 may include a display (e.g., any suitable digital display) and/or user input such as a touch pad, RFID sensor, contactless information sensor, and/or any other suitable communication and/or input/out device, sensor, or component. The pump center may include a computing device and/or an information chip for sending and receiving information (e.g., via a wired or wireless connection).

Pump center 132 may communicate with controller 134, which alone or together with the computing device of pump center 132 may be a pump controller. Controller 134 may be tasked with communicating with other components of FIG. 1B. Controller 134 may be in communication with a database 137 for saving and receiving information about transactions, users, purchases, and the like. Point of sale 136 may be a computing device for executing overseeing, and/or facilitating transactions. In one example, point of sale 135 may be a computing device at a checkout counter and/or may be responsible for executing a purchase.

Merchant 140 may including remote or onsite (e.g., at site 135) computing devices including processing center 141 and/or database 140. Merchant 140 may, in one example, receive a token (e.g., from payment system 170) and/or may optionally share the token with site 135. Processing center 141 may be any computing device that may process operations and/or tasks at site 135 and/or may oversee operation of site and communicate with payment system 170. Processing center may save and/or retrieve information at database 142.

Payment system 170 may be any suitable computing device and may communicate with only merchant 140 or may communicate with merchant 140 and site 135. Payment system 170 may include processing center 171 which may oversee operation of payment system 170 and/or process information received by merchant 140, site 135 and/or carrier 180. Payment system 170 may include ledger 173 which maintain purchases (e.g., of fuel) and other related information and decision engine 172, which may be used to make decisions and/or oversee tasks and operations on payment system 170. Processing center 171 may communicate with database 174, which maintain and save information used by processing center 171.

Configuration engine 176 may communicate with processing center 171 and may configure user information, carrier information, broker information, and/or any other relevant information. Configuration engine 176 may communicate with database 175 which may save and/or maintain any such information. Configuration engine 176 may further oversee portal 178 which may be a web port for payment system 170 and/or app 177, which may be a user application of payment system 170. Payment system 170 may be in communication with carrier 180, which may include the electronic logging devices (ELD) and/or transportation management systems.

Figure 2:
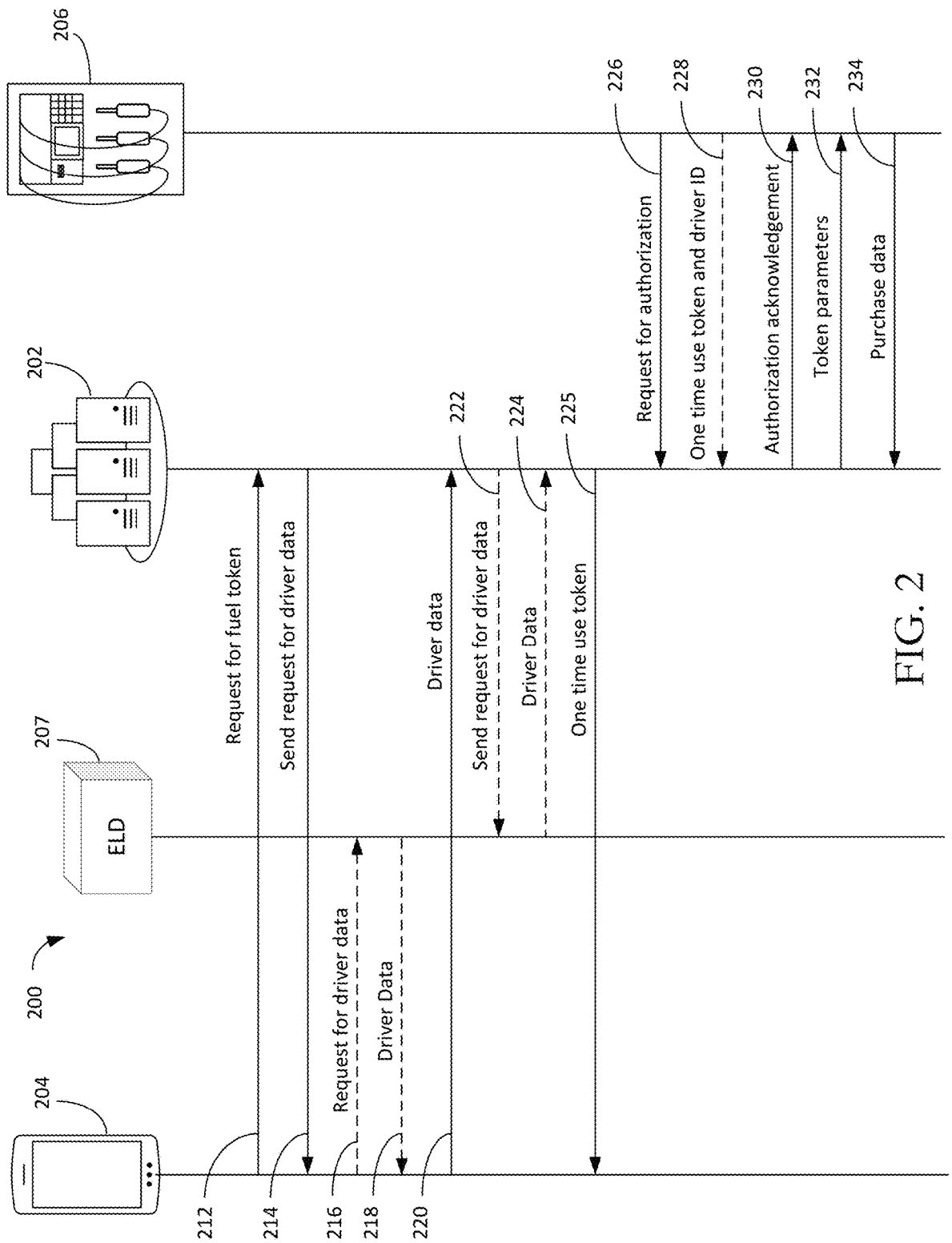
FIG. 2 is a schematic illustration of data flow in an example use case of the payment system for purchasing fuel, in accordance with one or more exemplary embodiments of the disclosure.

Referring now to FIG. 2, an exemplary data flow for a payment system for purchasing fuel is illustrated, in accordance with one or more exemplary embodiments of the disclosure. It is understood that any steps in FIG. 2 may be optional and/or that the steps may be performed in a different order. As shown in FIG. 2, data flow 200 may include communication between user device 204, electronic logging device (ELD) 207, server 202, and/or pump controller 206. User device 204 may be the same as or similar to user device 104 of FIG. 1A, server 202 may be the same as or similar to server 102 of FIG. 1A, and/or pump controller 206 may be the same as or similar to pump controller 106 of FIG. 1A.

ELD 207 may be any suitable electronic logging device used in the trucking and/or shipping industry for collecting data regarding vehicle operation and/or performance (e.g., fuel level, miles traveled, location, load weight, vehicle identifier, equipment type and/or maintenance records, etc.). It is understood that the ELD may be optional in data flow 200. Pump controller 206 may optionally incorporate both pump controller 106 and a fuel pump.

Data flow 200 may be initiated by user device 204 running a user application (e.g., user application 115 of FIG. 1A). At step 212 a request for a fuel token is sent to server 202, which is running the payment system. The request may include a driver identifier, a company identifier, that the request is for fuel, a location and/or a time stamp. At step 214, a server 202 may send user device 204 a request for driver data. Driver data may include information about the last fuel stop (e.g., when, where, how much fuel), information about the vehicle's fuel capacity, additional location information, direction of travel information (e.g., navigation information), refueling history, and the like.

At step 216, user device 218 may optionally communicate with ELD 207 to request certain user data known only by ELD. For example, ELD may have information about a current fuel level or a fuel measurement that may not be known by user device 204. At step 218, ELD 207 may send the driver data either to user device 204 or, alternatively, may send the driver data to server 202 (e.g., by any suitable wireless connection). At step, 220, user device may send driver data to server 202. For example, this information may be saved locally on user device 204 and/or provided by ELD 207.

At optional step 222, server 202 may optionally request driver data directly from ELD 207. For example, server 202 may determine that additional driver data is required. At optional step 225, ELD 207 may send the additional data to server 202. Alternatively, in steps 222 and 224 ELD 207 and/or server 202 may communicate via user device 204.

Server 202 may analyze the driver data and compare the driver data to certain rules and/or constraints (e.g., associated with the driver identifier and company identifier). For example, server 202 may compare a fuel level to a fuel capacity value to determine the amount of fuel required to fill the tank and determine whether the amount of fuel required to fill the tank is within a fuel allotment amount for that specific driver. In another example, server 202 may consider a distance traveled since the last fuel stop and determine whether the distance traveled satisfies a threshold for a fuel stop.

At step 225, server 202 may send a one-time use token to user device 204. Server 202 may also send an expiration time associated with the token, and one or more fueling stations in certain radius (e.g., 5, 10, 15 miles) that have been approved for use of the token. At step 226, server 202 may receive a request for authorization from pump controller 206, which may be a pump controller at one of the approved fueling stations. The request for authorization may include the token (e.g., alphanumeric number) and/or a representation of the token (e.g., portion of alphanumeric number) and the user identifier (e.g., driver identifier). Alternatively, at step 228, the token or representation of the token may be sent separately from the request for authorization at step 226.

At step 230, server 102 may process the request for authorization of the token and authenticate that the token is valid and is associated with the driver identifier. If the request satisfies certain rules and/or constraints (e.g., based on fuel allotment data) corresponding to the driver identifier and/or company identifier, then the sever will send an authorization and/or approval acknowledgement. Fuel allotment data may include, for example, a tank capacity value, an initial fueling location, a gallon allotment for a set period of time, a fuel measurement, an initial fueling time, and/or average fuel consumption. Server 232 may also send token parameters (e.g., expiration time, fuel limit, etc.) to pump controller 206. Once the transaction is complete, pump controller 206 may share purchase data with server 202, which may include for example an amount of fuel pump, a fuel price per gallon, a time stamp, and/or any other relevant information about the transaction.

Figure 3:
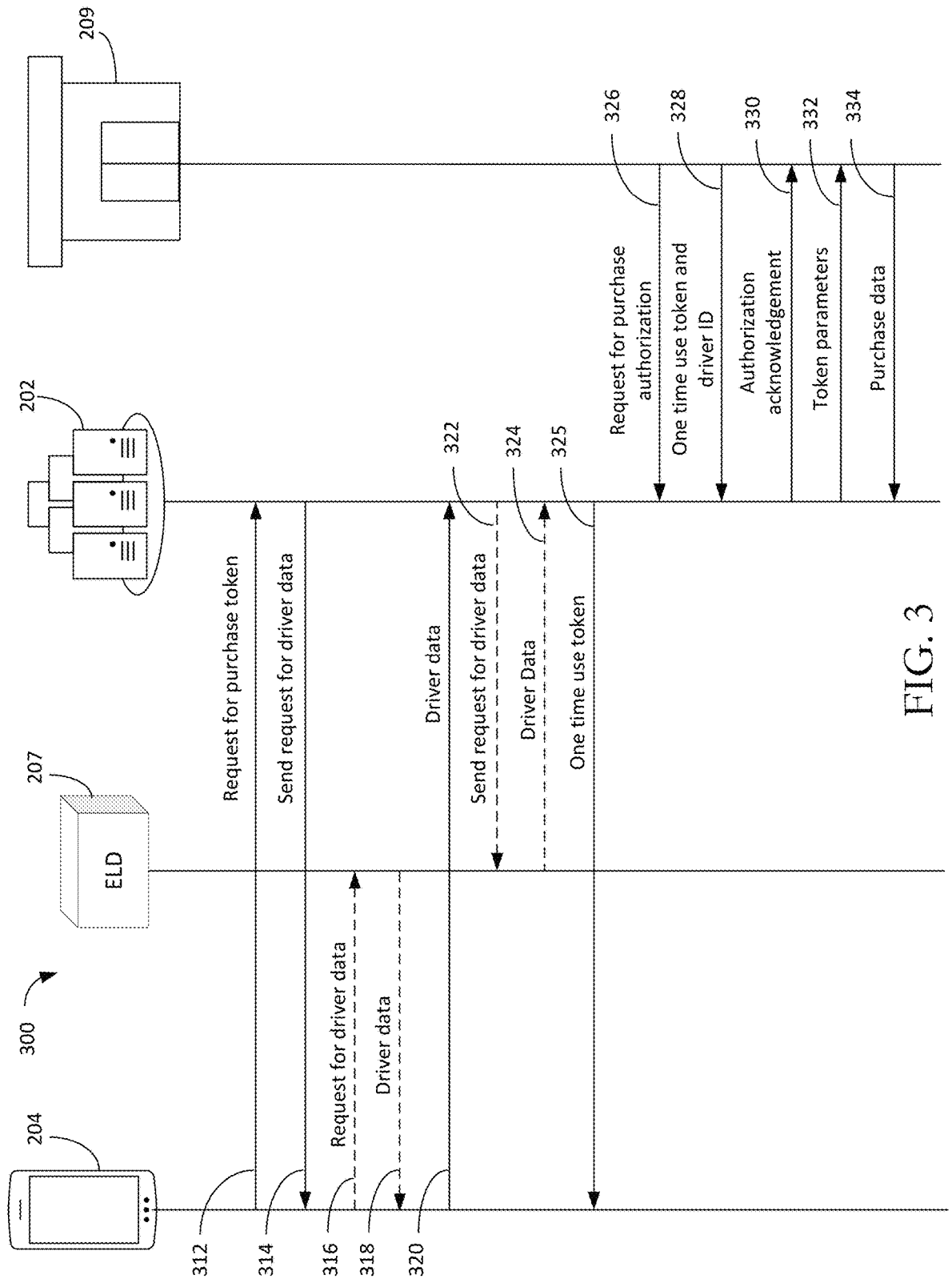
FIG. 3 is a schematic illustration of data flow in an example use case of the payment system for purchasing items, in accordance with one or more exemplary embodiments of the disclosure.

Referring now to FIG. 3, an exemplary data flow for a payment system for purchasing an item (e.g., product, item, food, service) is illustrated, in accordance with one or more exemplary embodiments of the disclosure. It is understood that any steps in FIG. 3 may be optional and/or that the steps may be performed in a different order. As shown in FIG. 3, data flow 300 may include communication between user device 204, electronic logging device (ELD) 207, server 202, and/or pump controller 209. Store controller 209 may be similar to pump controller 206 but may be any type of computing device in a store (e.g., computer at the checkout counter) It is understood the ELD 207 may be optional.

Data flow 300 may be initiated by user device 204 running an payment system application. At step 312 a request for a purchase token is sent to server 202, which is running the payment system. The request may include a driver identifier, a company identifier, that the request is for an item (e.g., non-fuel purchase), a location, and/or a time stamp. At step 314, a server 202 may send user device 204 a request for driver data. Driver data may include information about the last purchase (e.g., when, where, what, amount, etc.), additional location information, purchase history, and the like. For example, driver data may include a purchase history of what items were purchased, the price, where, and/or when.

At step 316, user device 204 may optionally communicate with ELD 207 to request certain driver data maintained by the ELD. For example, ELD may have information regarding prior service and maintenance and/or sensor data corresponding to parts (e.g., oil sensor) and/or may have information about time estimates for replacing certain parts. At step 318, ELD 207 may send the driver data either to user device 204 or alternatively, may send the driver data to server 202 (e.g., by any suitable wireless connection). At step, 320, user device may send driver data to server 202. For example, this information may be saved locally on user device 204 and/or provided by ELD 207.

At optional step 322, server 202 may request driver data directly from ELD 207. For example, server 202 may determine that additional driver data is required. At optional step 324, ELD 207 may send the additional driver data to server 202. Alternatively, in steps 322 and 324 ELD 207 and/or server 202 may communicate via user device 204.

Server 202 may analyze the driver data and compare the driver data to certain rules and/or constraints (e.g., associated with the driver identifier, vehicle identifier, and company identifier). For example, server 202 may compare a request to purchase with a per diem amount, an item allotment, a time of last purchase, and/or other purchase history data). In one example, a company may limit the user to a certain number of items in a time period (e.g., only four coffees per day) or may include an amount allotment for a category of food (e.g., 3 dollars a day for snacks). Server 202 may also, or alternatively, consider company parameters such as cost allotment per time period, cost allotment per item category, cost allotment per meal period, repair allotment, and supply allotment.

At step 325, server 202 may send a one-time use token to user device 104. Server 202 may also send an expiration time associated with the token, and one or more stores (e.g., fuel station stores) in certain a radius (e.g., 5, 10, 15 miles) that have been approved for use of the token. At step 326, server 202 may receive a request for authorization from store controller 209, which may be a controller onsite at the store (e.g., computer at checkout counter). The request for authorization may include the token (e.g., alphanumeric number) and/or a representation of the token (e.g., portion of alphanumeric number) and the user identifier (e.g., driver identifier). Alternatively, at step 328, the token or representation of the token may be sent separately from the request for authorization at step 226.

At step 330, server 202 may process the request for authorization and token and authenticate that the token is valid and is associated with the driver identifier. If the request satisfies certain rules and/or constraints (e.g., based on purchase history data) corresponding to the driver identifier and/or company identifier, then the sever will send an authorization and/or approval acknowledgement. Purchase history data may include, for example, prior purchase amounts, prior purchase items, prior purchase categories, prior purchase dates, prior purchase times, and/or prior purchase locations. Server 332 may also send token parameters (e.g., expiration time, item limit, cost limit, etc.) to store controller 209. Once the transaction is complete, store controller 209 may share purchase data with server 202, which may include, for example, the items purchased, the cost, a time stamp, and/or any other relevant information about the transaction.

Figure 4:
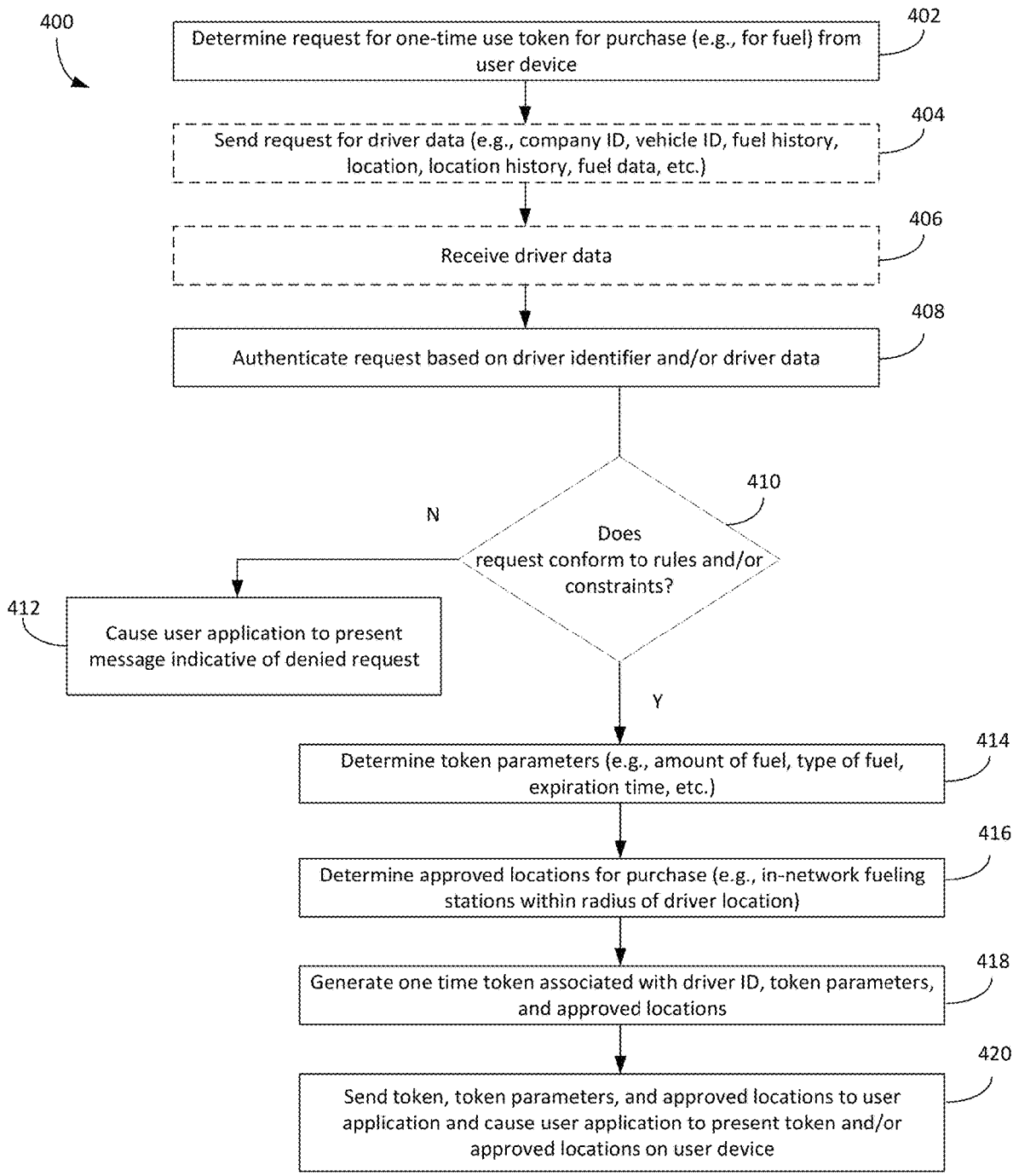
FIG. 4 is an example process flow for an example use case of the payment system for generating a token, in accordance with one or more exemplary embodiments of the disclosure.

Referring now to FIG. 4, example process flow 400 of a payment system is depicted for purchasing fuel, items and/or services, for example, in accordance with one or more exemplary embodiments of the disclosure. It is understood that one or more steps of process flow 400 may be optional and/or one or more steps of process flow 400 may be performed in a different order. Process flow may be performed by a server (e.g., server 102 of FIG. 1A), for example, alone or together with any other devices described herein.

To initiate process flow 400, at block 402 computer-executable instructions stored on a memory of a device, such as a computing device and/or server, may be executed to determine a request for a one-time use token for purchase from a user device. The request may include a driver identifier (e.g., user identifier), a company identifier, and a location (e.g., a location of the user device), for example. The request may also be associated with a time stamp.

At optional block 404 computer-executable instructions stored on a memory of a device, such as a computing device and/or server, may be executed to send a request for driver data to the user device and/or an ELD. The driver data may include, for example, a company identifier, a vehicle identified, fuel history, location data, location history, fuel data and/or history, and/or the like. At optional block 406, computer-executable instructions stored on a memory of a device, such as a computing device and/or server, may be executed to receive or otherwise retrieve the driver data.

At block 408 computer-executable instructions stored on a memory of a device, such as a computing device and/or server, may be executed to authenticate the request based on the driver identifier and/or driver data. For example, the system may confirm the driver identifier is in the system.

Additionally, the request may include a device identifier to authenticate that the user device is associated with the driver identifier At decision 410, computer-executable instructions stored on a memory of a device, such as a computing device and/or server, may be executed to determine if the request conforms to or satisfies certain rules and/or constraints. For example, the request may be authenticated based on a calculated fuel velocity, a measurement of current fuel levels, time from last fueling, and/or a distance traveled. Fuel velocity may be an estimated fuel consumption based on the distance traveled. The rules and constraints may be associated on the system with the driver identifier, the vehicle identifier, and/or the company identifier for example.

If the request does not conform to the rules and/or constraints (e.g., the request is premature based on the estimated fuel velocity or an allotment for gallons of fuel for a given time has been exceeded) then the user device will be cause the user device to present a message indicative of the denied request. Alternatively, if the request conforms to or satisfies the rules and/or constraints (e.g., the request is consistent with a fuel velocity estimation, the fuel allotment has not be consumed, the time since last fuel up has exceeded a threshold value) then computer-executable instructions stored on a memory of a device, such as a computing device and/or server, may be executed to determine certain token parameters.

Token parameters may include for example, a limit on the cost or number of gallons of fuel to be dispensed (e.g., limit 100 gallons max), an expiration time, after which fuel may no longer be dispensed, an expiration time for inputting the token into the controller, and the like. At block 416, computer-executable instructions stored on a memory of a device, such as a computing device and/or server, may be executed to determine approved locations for purchase. For example, fueling stations that are in-network or otherwise pre-approved may be determined. The location associated with the request and/or driver data may be compared to the list of pre-approved fueling stations to determine stations within a certain radius (e.g., 2 miles, 5 miles, 10 miles, 15 miles, etc.)

At block 418, computer-executable instructions stored on a memory of a device, such as a computing device and/or server, may be executed to generate a one-time token associated (e.g. on the server) with the driver identifier, token parameters and/or approved locations. At block 420, computer-executable instructions stored on a memory of a device, such as a computing device and/or server, may be executed to send the token, token parameters and/or approved locations to a user application running on a user device to present the token, expiration time, token parameters, and/or approved locations on the user device.

Figure 5:
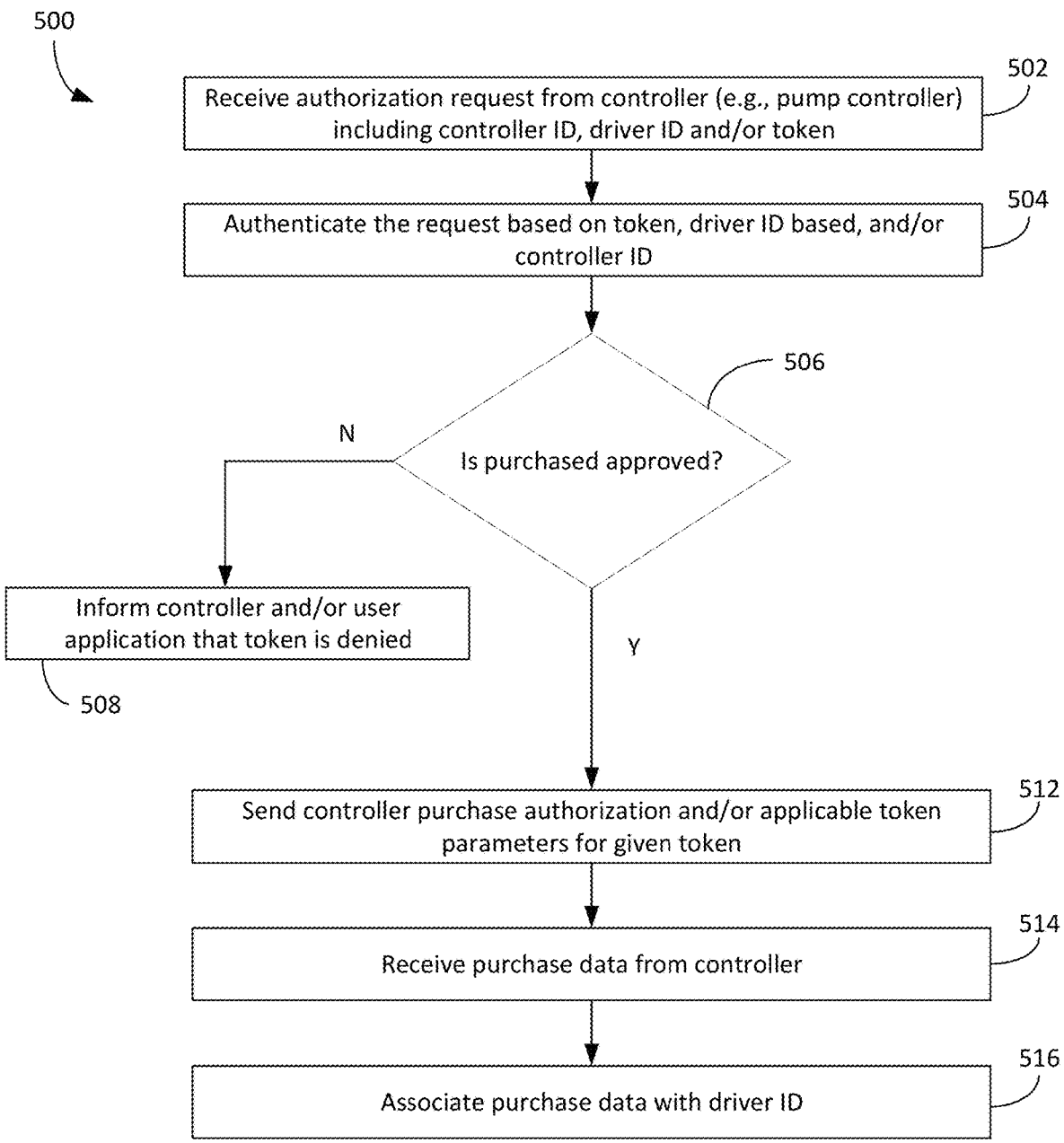
FIG. 5 is an example process flow for a use case of the payment system for authenticating a purchase, in accordance with one or more exemplary embodiments of the disclosure.

Referring now to FIG. 5, example process flow 500 of a payment system is depicted for authorizing and/or approving a purchase request, in accordance with one or more exemplary embodiments of the disclosure. It is understood that one or more steps of process flow 500 may be optional and/or one or more steps of process flow 500 may be performed in a different order. Process flow 500 may be performed by a server (e.g., server 102 of FIG. 1A), for example, alone or together with any other devices described herein.

To initiate process flow 500, at block 502 computer-executable instructions stored on a memory of a device, such as a computing device and/or server, may be executed to receive an authorization from a controller (e.g., a pump controller or store controller). The request may include a controller location, a controller identifier, a driver identifier, and/or the token. At block 504, computer-executable instructions stored on a memory of a device, such as a computing device and/or server, may be executed to authenticate the request. For example, the system may confirm that the token is associated with the user identifier and/or may confirm that the controller identifier is associated with one of the approved locations and the request is before the expiration time associated with the token.

At decision 506, computer-executable instructions stored on a memory of a device, such as a computing device and/or server, may be executed to determine if the purchase is approved. This decision may be based solely on the authentication factors at block 504 and/or may be based on whether certain rules and/or constraints associated with the token and/or user identifier are satisfied. For example, the request may include purchase information and the system may confirm that the purchase information conforms to or is consistent with the token. Purchase information may include an amount of gallons, a type of items being purchased (e.g., coffee, alcohol, non-diesel fuel), a category of the item to be purchased (e.g., snacks) and/or any other information relevant to the item.

If the purchase is not approved, at block 508, computer-executable instructions stored on a memory of a device, such as a computing device and/or server, may be executed to inform the controller and/or user application that the purchase and/or token is denied. Alternatively, if the purchase is approved, at block 512, computer-executable instructions stored on a memory of a device, such as a computing device and/or server, may be executed to send the controller purchase authorization and/or applicable token parameters for a given purchase (e.g., limit on a number of gallons to be dispensed or limit on cost).

At block 514, computer-executable instructions stored on a memory of a device, such as a computing device and/or server, may be executed to receive purchase data from a controller, which may include the items purchased, an amount of gallons dispensed, a cost for the purchased, and the like. At block 516, computer-executable instructions stored on a memory of a device, such as a computing device and/or server, may be executed to associate (on the server) the purchase data with the driver identifier.

Figure 6:
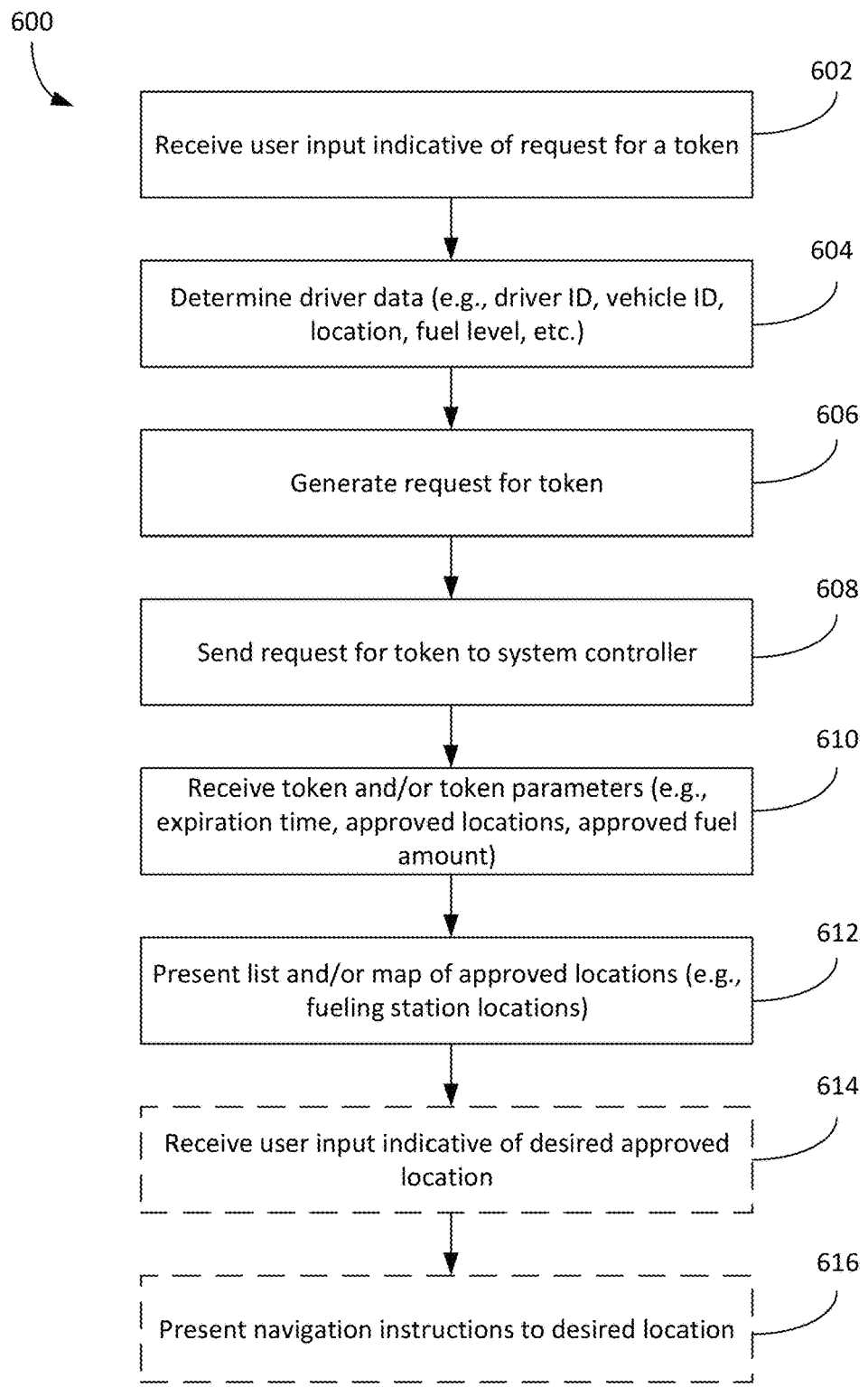
FIG. 6 is an example process flow for an example use case of the payment system for requesting a token, in accordance with one or more exemplary embodiments of the disclosure.

Referring now to FIG. 6, example process flow 600 of a user application of a payment system running on a user device is depicted for requesting a token, in accordance with one or more exemplary embodiments of the disclosure. It is understood that one or more steps of process flow 600 may be optional and/or one or more steps of process flow 600 may be performed in a different order. Process flow 500 may be performed by a server (e.g., server 102 of FIG. 1A), for example, alone or together with any other devices described herein.

To initiate process flow 600, at block 602, computer-executable instructions stored on a memory of a device, such as a computing device and/or server, may be executed to receive user input indicative of a request for a token. For example a user may enter user input on a graphic user interface displayed by a user application on a user device (e.g., user application 115 on user device 104 of FIG. 1A) to request to purchase fuel or another item. At block 604, the application may determine driver data (e.g., driver identifier, vehicle identifier, location, a fuel level or measurement, etc.).

At block 606, computer-executable instructions stored on a memory of a device, such as a computing device and/or server, may be executed to generate a request for a token which may include the driver data, a location of the user device and/or a time stamp. At block 608, computer-executable instructions stored on a memory of a device, such as a computing device and/or server, may be executed to send the request for a token and any associated information to a system controller.

At block 610, computer-executable instructions stored on a memory of a device, such as a computing device and/or server, may be executed to receive the requested token and/or any token parameters (e.g., expiration time, approved locations, approved fuel amount.). At block 612, computer-executable instructions stored on a memory of a device, such as a computing device and/or server, may be executed to present on a display of the user device a list and/or map of approved locations (e.g., fueling stations), the expiration time, and/or other token parameters.

At optional block 614, computer-executable instructions stored on a memory of a device, such as a computing device and/or server, may be executed to receive user input indicative of a selection of a certain approved location (e.g., fueling station). At optional block 616, computer-executable instructions stored on a memory of a device, such as a computing device and/or server, may be executed to present on the user device navigation instructions to the desired location.

Figure 7:
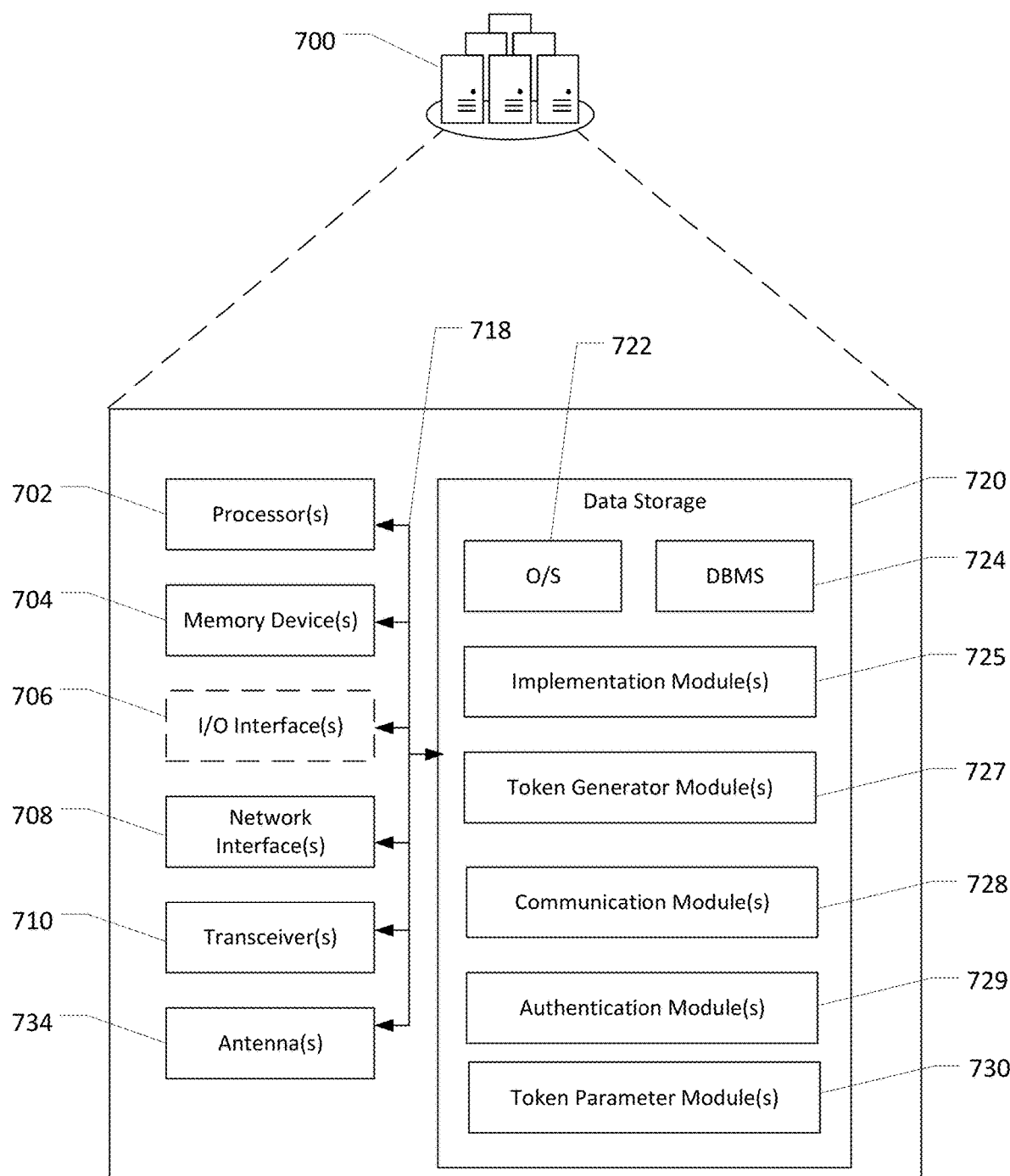
FIG. 7 is a schematic block diagram of a server in accordance with one or more exemplary embodiments of the disclosure.

FIG. 7 is a schematic block diagram of an illustrative server 700 of the payment system in accordance with one or more exemplary embodiments of the disclosure. Server 700 may be any suitable computing device capable of receiving and/or sending data and/or overseeing the payment system. Server 700 may optionally be coupled to and/or communicate with devices including, but not limited to, controllers, computing devices and/or one or more datastores, or the like. Server 700 may correspond to server 102 of FIG. 1A, and/or any other servers of FIGS. 1-6. It is understood that tasks and operations described herein may be performed by both server 700, a user device and/or controller (e.g., user device 104 and controller 106 of FIG. 1A).

Server 700 may be configured to communicate via one or more networks with one or more servers, user devices, controllers, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 700 may include one or more processors (processor(s)) 702, one or more memory devices 704 (generically referred to herein as memory 704), one or more input/output (I/O) interface(s) 706, one or more network interface(s) 708, one or more transceivers 710, one or more optional speakers, one or more optional microphones, and one or more antenna(s) 734. The computing device 700 may further include one or more buses 718 that functionally couple various components of the computing device 700. The computing device 700 may further include one or more antenna(e) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the computing device 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the computing device may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more optional database management systems (DBMS) 724; and one or more implementation module(s) 725, one or more token generator module(s) 727, one or more communication module(s) 728, one or authentication module(s) 729, and/or one or more token parameter module 730. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the computing device 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, user preference information, user contact data, device pairing information, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the computing device 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the implementation module(s) 725 may include computer-executable instructions, code, or the like that responsive to execution by one or more of the processor(s) 702 may perform functions including, but not limited to, overseeing coordination and interaction between one or more modules and computer executable instructions in data storage 720, determining user selected actions and tasks, determining actions associated with user interactions, determining actions associated with user input, sending and receiving signals and/or data to and from one or more user devices, controllers, other computing devices, servers, datastores and the like, initiating commands locally or at remote computing devices, and the like.

Token generator module 727 may include computer-executable instructions, code, or the like that responsive to execution by one or more of the processor(s) 702 may perform functions including, but not limited to generating token in response to a purchase request. The tokens may be alphanumeric values, computer readable codes (e.g., QR codes, bar codes, etc.), blockchain tokens, and/or any other token or code.

The communication module(s) 728 may include computer-executable instructions, code, or the like that responsive to execution by one or more of the processor(s) 702 may perform functions including, but not limited to, communicating with one or more user devices and controllers, for example, via wired or wireless communication, communicating with electronic devices, communicating with one or more user devices, computing devices, servers (e.g., servers), communicating with remote datastores and/or databases, sending or receiving notifications or commands/directives, communicating with cache memory data, and the like.

The authentication module 729 may include computer-executable instructions, code, or the like that responsive to execution by one or more of the processor(s) 702 may perform functions including, but not limited to, authenticating a request by comparing a user identifier and/or device identifier to known user identifiers and/or device identifiers. Authentication module 729 may further authenticate a token based on a user identifier, a store or station location, and/or a time.

The token parameter module 730 may include computer-executable instructions, code, or the like that responsive to execution by one or more of the processor(s) 702 may perform functions including, but not limited to, determining token parameters which may be limits on the purchase (e.g., limit on cost, number of gallons limit, limit on number of items) and/or an expiration time for example.

Referring now to other illustrative components depicted as being stored in the data storage 720, the O/S 722 may be loaded from the data storage 720 into the memory 704 and may provide an interface between other application software executing on the computing device 700 and hardware resources of the computing device 700. More specifically, the O/S 722 may include a set of computer-executable instructions for managing hardware resources of the computing device 700 and for providing common services to other application programs (e.g., managing memory allocation among various application programs). In certain example embodiments, the O/S 722 may control execution of the other program module(s) to for content rendering. The O/S 722 may include any operating system now known or which may be developed in the future including, but not limited to, any server operating system, any mainframe operating system, or any other proprietary or non-proprietary operating system.

The optional DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. As the computing device 700 is a mobile electronic device, the DBMS 724 may be any suitable light-weight DBMS optimized for performance on a mobile device.

Referring now to other illustrative components of the computing device 700, the optional input/output (I/O) interface(s) 706 may facilitate the receipt of input information by the computing device 700 from one or more I/O devices as well as the output of information from the computing device 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 734 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 700 may further include one or more network interface(s) 708 via which the computing device 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna(e) 734 may include any suitable type of antenna depending, for example, on the communications protocols used to transmit or receive signals via the antenna (e) 734. Non-limiting examples of suitable antennas may include directional antennas, non-directional antennas, dipole antennas, folded dipole antennas, patch antennas, multiple-input multiple-output (MIMO) antennas, or the like. The antenna(e) 734 may be communicatively coupled to one or more transceivers 710 or radio components to which or from which signals may be transmitted or received.

As previously described, the antenna(e) 734 may include a Bluetooth antenna configured to transmit or receive signals in accordance with established standards and protocols, such as Bluetooth and/or BLE. Alternatively, or in addition to, antenna(e) 734 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 734 may be configured to transmit or receive radio frequency signals within any suitable frequency range forming part of the unlicensed portion of the radio spectrum (e.g., 900 MHz).

The antenna(e) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 710 may include any suitable radio component(s) for—in cooperation with the antenna(e) 734—transmitting or receiving radio frequency (RF) signals in the bandwidth and/or channels corresponding to the communications protocols utilized by the computing device 700 to communicate with other devices. The transceiver(s) 710 may include hardware, software, and/or firmware for modulating, transmitting, or receiving—potentially in cooperation with any of antenna(e) 734—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 710 may further include hardware, firmware, or software for receiving GNSS signals. The transceiver(s) 710 may include any known receiver and baseband suitable for communicating via the communications protocols utilized by the computing device 700. The transceiver(s) 710 may further include a low noise amplifier (LNA), additional signal amplifiers, an analog-to-digital (A/D) converter, one or more buffers, a digital baseband, or the like.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 700 and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computing device 700 may include alternate and/or additional hardware, software, or firmware components beyond those described or depicted without departing from the scope of the disclosure. More particularly, it should be appreciated that software, firmware, or hardware components depicted as forming part of the computing device 700 are merely illustrative and that some components may not be present or additional components may be provided in various embodiments. While various illustrative program module(s) have been depicted and described as software module(s) stored in data storage 720 it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more exemplary embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by a server and from a mobile device, a request for a token for purchasing fuel at a fuel pump, the request comprising a first user identifier and a location value;
   determining fuel allotment data corresponding to the first user identifier;
   determining that the request for the token is approved based on the fuel allotment data;
   determining a first fuel station based on the location value, wherein the first fuel station is within a set mile radius of the location value;
   generating a first token value corresponding to the first user identifier and the first fuel station;
   sending the first token value to the first device;
   receiving, from a fuel controller associated with the first fuel station, a request to activate a particular fuel pump, the request comprising the first token value, wherein the particular fuel pump comprises a keypad, and wherein the fuel controller is configured to receive the first token value via the keypad;
   determining that the request to activate the particular fuel pump is approved based on the first token value;
   causing the fuel controller to activate the particular fuel pump for a predetermined amount of fuel based on the fuel allotment data;
   determining that the predetermined amount of fuel has been dispensed by the particular fuel pump; and
   causing the fuel controller to deactivate the particular fuel pump.

2. The method of claim 1, wherein the fuel allotment data comprises one or more of a tank capacity value, an initial fueling location, a gallon allotment for a set period of time, a fuel measurement, an initial fueling time, and average fuel consumption.

3. The method of claim 1, wherein the request from the fuel controller comprises a second token value, a second user identifier, and a station identifier, the authentication request corresponding to a second time.

4. The method of claim 3, further comprising:
   determining the second token is the same as the first token;
   determining that the second user identifier is the same as the first user identifier; and
   determining that the station identifier corresponds to the first fuel station.

5. The method of claim 1, further comprising:
   causing the fuel controller to activate the particular fuel pump for a length of time based on an expiration value.

6. The method of claim 3, further comprising:
   determining a fuel measurement corresponding to a vehicle associated with the first user identifier; and
   determining a fuel limit amount based on the fuel measurement.

7. The method of claim 3, further comprising:
   determining an expiration value; and
   determining that the second time satisfies the expiration value.

8. The method of claim 1, further comprising:
   determining an initial fueling location corresponding to the first user identifier; and
   determining a fuel estimation value based on the location and the initial fueling location,
   wherein determining that the request for the token is approved is based at least in part on the fuel estimation value.

9. The method of claim 1, further comprising:
   determining an initial fueling location corresponding to the first user identifier; and
   determining a time estimation value based on the location and the initial location.

10. The method of claim 1, wherein the first token value is an alphanumeric code.

11. The method of claim 1, wherein the fuel controller is associated with a plurality of fuel pumps.

12. A system comprising:
    memory configured to store computer-executable instructions; and
    at least one computer processor configured to access memory and execute the computer-executable instructions to:
        determine, from a mobile device, a request for a token for purchasing fuel at a fuel pump, the request comprising a first user identifier and a location value;
        determine fuel allotment data corresponding to the first user identifier;
        determine that the request for the token is approved based on the fuel allotment data;
        determine a first fuel station based on the location value, wherein the first fuel station is within a set mile radius of the location value;
        generate a first token value corresponding to the first user identifier and the first fuel station;
        send the first token value to the first device;

receive, from a fuel controller associated with the first fuel station, a request to activate a particular fuel pump, the request comprising the first token value, wherein the particular fuel pump comprises a keypad, and wherein the fuel controller is configured to receive the first token value via the keypad;

determine that the request to activate the particular fuel pump is approved based on the first token value;

cause the fuel controller to activate the particular fuel pump for a predetermined amount of fuel based on the fuel allotment data;

determine that the predetermined amount of fuel has been dispensed by the particular fuel pump; and cause the fuel controller to deactivate the particular fuel pump.

13. The system of claim 12, wherein fuel allotment data comprises one or more of a tank capacity value, an initial fueling location, a gallon allotment for a set period of time, a fuel measurement, an initial fueling time, and an average fuel consumption.

14. The system of claim 12, wherein the request from the fuel controller comprises a second token value, a second user identifier, and a station identifier, the authentication request corresponding to a second time.

15. The system of claim 14, wherein the computer processor is further configured to execute the computer-executable instructions to:

determine the second token is the same as the first token;

determine that the second user identifier is the same as the first user identifier; and determine that the station identifier corresponds to the first fuel station.

16. The system of claim 12, wherein the computer processor is further configured to execute the computer-executable instructions to cause the fuel controller to activate the particular fuel pump for a length of time based on an expiration value.

17. The system of claim 12, wherein the computer processor is further configured to execute the computer-executable instructions to:

determining a fuel measurement corresponding to a vehicle associated with the first user identifier; and determining a fuel limit amount based on the fuel measurement.

18. The system of claim 12, wherein the computer processor is further configured to execute the computer-executable instructions to:

determine an initial fueling location corresponding to the first user identifier; and determine a fuel estimation value based on the location and the initial fueling location, wherein determining that the request for the token is approved is based at least in part on the fuel estimation value.

19. The system of claim 12, wherein the computer processor is further configured to execute the computer-executable instructions to:

determine an initial fueling location corresponding to the first user identifier; and determine a time estimation value based on the location and the initial location.

20. The system of claim 12, wherein the fuel controller is associated with a plurality of fuel pumps.

* * * * *